United States Patent [19]

Bölsing

[11] 4,018,679

[45] Apr. 19, 1977

[54] METHOD OF RENDERING WASTE SUBSTANCES HARMLESS

[76] Inventor: Friedrich Bölsing, Bahnhofstrasse 3, 4965 Lindhorst, Germany

[22] Filed: May 31, 1974

[21] Appl. No.: 475,341

Related U.S. Application Data

[63] Continuation-in-part of Ser. No. 192,333, May 10, 1971, Pat. No. 3,897,238.

[30] Foreign Application Priority Data

June 6, 1973 Germany ............................ 2328777
June 6, 1973 Germany ............................ 2338778

[52] U.S. Cl. .................................. 210/36; 210/59; 61/35
[51] Int. Cl.² .......................................... C02C 5/02
[58] Field of Search ............. 61/35; 210/36, 40, 59, 210/DIG. 23

[56] References Cited

UNITED STATES PATENTS

| 3,720,609 | 3/1973 | Smith et al. ........................... 61/35 |
| 3,897,238 | 7/1975 | Bolsing et al. ............................ 71/3 |

FOREIGN PATENTS OR APPLICATIONS

| 2,070,987 | 9/1971 | France ................................. 210/36 |
| 2,010,500 | 10/1970 | Germany ............................. 210/36 |
| 1,804,419 | 5/1970 | Germany ............................. 210/40 |

*Primary Examiner*—Thomas G. Wyse
*Attorney, Agent, or Firm*—Burgess, Dinklage & Sprung

[57] ABSTRACT

A method for rendering harmless an oily waste material comprising mixing an alkaline earth metal oxide with a surface active agent which delays reaction between the alkaline earth metal oxide and water, combining the mixture with said oily material, and reacting the alkaline earth metal oxide charged with the waste material with approximately the stoichiometric amount of water to convert the alkaline earth metal oxide to the hydroxide. The alkaline earth metal oxide is preferably calcium oxide and advantageously it is also mixed with a hydrophobizing agent prior to mixture with the oily waste material. The proportions are desirably such that the end product is a solid which can be used as a lining in road construction and at dump sites.

12 Claims, No Drawings

METHOD OF RENDERING WASTE SUBSTANCES HARMLESS

This application is a continuation-in-part of application Ser. No. 192,333, filed May 10, 1971, now U.S. Pat. No. 3,897,238, the disclosure of which is incorporated herein by reference.

The invention relates to a method for rendering waste substances harmless, especially used oils and oily substances.

The increasing use of hydrophobic substances, such as oils and oily substances, as well as macromolecular substances especially, has created new problems which arise mainly out of the handling of these substances. Particularly the use of old oil, heating oils, lubricating oils and diesel fuels often leads, either intentionally or through negligence, and often due to emergency situations, to dangerous contamination of the environment.

There are a number of methods for rendering harmless oils or oily substances which, in a single phase or in multiple phase systems, entail an endangerment of the environment. Thus, for example, oil can be chemically reacted by being burned, for example, or biologically degraded.

The combustion method used frequently in combatting oil damage results in considerable air pollution if the burning is performed in the open rather than in expensive combustion apparatus.

The use of adsorbents solves the present problem only when the oil can be fixed with them in such a manner that it is chemically unaltered but no longer constitutes any danger to the environment or is accessible to biological degradation. With the known adsorptive agents such as active charcoal, kieselguhr or bentonite, waste oil, for example, can be adsorptively bound only with difficulty. Large amounts of oil may cement the adsorptive agent, especially in the case of high-viscosity oils, making further processing difficult. It has furthermore been proposed in various ways to treat porous mineral substances with hydrophobic substances for the purpose of improving their adsorptive characteristics. In this manner hydrophobic waste substances can be preferentially bound, while the water is no longer primarily absorbed. In such adsorptive agents, such as hydrophobized pearlite, however, the absorptive capacity is greatly reduced, since the mineral starting material is partially sealed by surface treatment with hydrophobizing substances, so that the inner cavities are no longer accessible.

It is particularly important that the substances which are adsorptively bound by the known processes are so fixed on the adsorptive agent that they no longer constitute any danger to the environment.

The invention is addressed to the problem of creating a method which in a simple manner will make it possible to render waste substances harmless, especially used oils and oily substances and relates to an improvement over the process described in my above-mentioned applicaton Ser. No. 192,333.

Specifically, the invention constitutes a method for rendering harmless an oily waste material comprising mixing an alkaline earth metal oxide with a surface active agent which delays reaction between the alkaline earth metal oxide and water, combining the mixture with said oily material, and reacting the alkaline earth metal oxide charged with the waste material with approximately the stoichiometric amount of water to convert the alkaline earth metal oxide to the hydroxide.

The applicability of the process of the invention is largely independent of the physical state of the waste substances, and is also possible, for example, when the mostly organic wastes are in the form of solids which are still suspended in water at low temperature, and do not become liquid until the temperature is increased or until they are dissolved by a solvent. They may be not only one-phase systems and two-phase systems of water and an organic fluid that is not miscible or is miscible only to a limited extent with water, but also multiple-phase systems with the inclusion of finely divided solids. The viscosity of the phase containing the wastes is not of decisive importance for the applicability of the method of the invention.

The same applies to the chemical nature of the wastes. They may be both monomeric compounds and polymers, polycondensates and polyaddition compounds. These substances may be of natural or synthetic origin. Examples of waste substances which occur in practice also in the form of emulsions are: old oils, such as used motor oils, cutting oils, drilling oils, vegetable and animal fats, waxes and wax-like substances such as those produced by the removal of wax from automobiles, tar oils, resins, bituminous substances and pitches, acid resins, synthetic resins, petroleum, petroleum fractions such as gasoline and kerosene, as well as machine oils, cylinder oils and lubricating oils, and also aromatic compounds such as benzene and toluene.

The following are given as examples of multi-phase systems which are produced, sometimes in large quantities, as a waste product in technical processes, and which can be rendered harmless by the method of the invention:

Acid resins, drilling greases, drilling oils, cutting oils, enamel emulsions, waste impregnating emulsions used in the textile industry as well as resin emulsions in the paper industry, synthetic resin emulsions such as are produced in the after-treatment of metals, waste waters containing grease and oil discharged from machines for washing ball bearings and friction bearings, electroplating sludges, bleaching earths charged with oily components such as are produced, for example, in the decoloring of dark mineral oils, fats and waxes.

Suitable for the performance of the process of the invention are all alkaline earth metal oxides, i.e. the oxides of calcium, barium, strontium or magnesium. For the purposes of the invention, calcium oxide is preferred in the form of the commercial quicklime, e.g., fine white lime, but coarse granules are usable in many cases. The quicklime may contain up to about 18 wt-% magnesium oxide or other foreign components. As the percentage of magnesium oxide increases the water slaking of the pretreated quicklime charged with the organic substances is slower and takes place with a lesser development of heat, which may be advantageous in a number of applications. On account of the preferred use of quicklime the following measures and advantages of the invention will be described only with reference to calcium oxide, although they apply essentially also to the other named alkaline earth metal oxides or their mixtures.

Quicklime reacts with water rapidly and exothermically. It would therefore be slaked, i.e., transformed to calcium hydroxide, in aqueous systems, without needing special preliminary treatment, and the calcium hydroxide would adsorb the oily substances just as unsatisfactorily as directly added slaked lime. Even hydrophobized calcium hydroxide has only a comparatively low capacity for the adsorption of oily substances.

Now it has surprisingly been found that calcium oxide behaves quite differently if, after preliminary treatment with hydrophobizing agents, it is reacted in the presence of the waste materials with water which either is already present in the system in the stoichiometric minimum amount necessary for the formation of hydroxide or is added after the absorption of the liquid wastes. What the reason for this is is not entirely understood. Apparently the calcium oxide micelles loaded with the hydrophobizing agent are protected against slaking with water, so that the formation of the hydroxide takes place only with a considerable delay whose degree depends on the quantity and chemical nature of the hydrophobizing agent. Since the reaction with water of a calcium oxide thus hydrophobized does not take place even after several minutes and may be delayed for as much as an hour or more, we are justified in speaking of a calcium oxide that does not react with water. It is all the more surprising that it can react with water again after it has come in contact with, for example, an organic waste substance, such as oils, and has managed to become charged therewith. It is assumed that the molecules of the hydrophobizing agent first cover the surface of the calcium oxide micelles and protect it against the attack of the water. Under the action of the organic substances contained in the nonaqueous phase, the molecules of the hydrophobizing agent become gradually inactivated i.e., absorbed by the organic phase, so that water molecules can get to the CaO lattice and, with a considerable increase in volume, form calcium hydroxide whose particles in statu nascendi absorb the organic substances.

In the method of the invention, the surface can increase to more than 20-fold during the formation of hydroxide in the presence of an organic phase. In particular, the surface enlargement depends on the nature of the substance to be adsorbed and on the surface-active substances used, which delay the reaction with water and with which the calcium oxide has been treated. The surface-active substances are contained in the quicklime in amounts of about 0.001 to 10% by weight, preferably about 0.01 to 5 wt-%. They are particularly effective when they are very uniformly distributed therein. This can be achieved by intimately grinding the quicklime, for example, in the presence of the surface active substances or by impregnating it with them if they are liquids of low viscosity, or by impregnating it with solutions of the surface active substances. This can be done, for example, by injecting them into a mixing drum in which the calcium oxide is being stirred.

For the purposes of the invention, surface active substances in the widest sense are suitable. Apparently the only important thing is that they have a special affinity for the waste substance to be separated, especially in the case of an aqueous multi-phase system, so that a preferred interaction with the latter takes place before the reaction with water begins.

Fundamentally, anion-active and cation-active as well as non-ionogenic surface active substances are usable. Chemically these substances may be in the following classes: fatty acids such as stearic and palmitic acid, alkyl sulfates, alkyl aryl sulfonates, alkyl sulfonates, sulfosuccinic acid esters, salts of carboxylic acids, the true soaps, sulfosuccinamides, ether sulfates, nonylphenylpolyglycol ethers, fatty alcohol polyglycol ethers and their sulfation products. Polyglycol ethers, aliphatic amines, aminoxides, aliphatic alcohols and cellulose derivatives as well as polymeric compounds are also usable.

The selectivity of the above-named adjuvants for the organic substances to be separated may be adjusted very precisely through the selection of the functional groups and of the chain length of the molecule. This is especially important whenever the substance to be adsorbed is inhomogeneous and contains substances of different origin, e.g., emulsifiers, lubricant additives, etc. It is desirable in determining the appropriate adjuvant to start with representatives of a homologous series. If one series fails completely, another is tested. With the aid of simple laboratory tests a suitable representative will be found in known homologous series, such as for example the series of the alkanes, the aliphatic carboxylic acids or the aliphatic alcohols. The precision with which the selective behavior of the adjuvant added to the calcium oxide can be adjusted is surprising to the technical man. For example, an emulsion that could not be separated by any former means can be separated within seconds by using a fine lime pretreated with n-octylamine, but the separation of the emulsion fails when the homologous $C_{12}$ amine is used.

The adjuvants may also be selected in such a manner as to cancel the effect of certain types of emulsifier present in the multi-phase system that is to be separated. For example, anion-active emulsifiers, such as soaps for example, can be rendered harmless by cation-active additives, such as long-chain ammonium salts for example, so that the separation of the emulsion takes place substantially rapidly. The same applies to the addition of other adjuvants, such as hydrocarbons for example.

To render hydrophobic wastes harmless it is desirable to use a calcium oxide treated with fatty acids or paraffin oil. The calcium oxide treated with these or other hydrophobizing agents is not of itself especially hydrophobic, but it loads up—preferentially it seems—with hydrophobic wastes when they occur in aqueous multi-phase systems. In the course of the gradually beginning reaction of the calcium oxide charged with the organic wastes with the water contained in the aqueous multi-phase system or added in accordance with the stoichiometric requirements, to form calcium hydroxide, the organic substances are adsorbed uniformly and extremely finely. The calcium hydroxide containing the hydrophobic adjuvant and the wastes displays an unusually intensified hydrophobic behavior, so that it can be separated without difficulty from any aqueous phase that might possibly remain. Furthermore, the calcium hydroxide that forms remains virtually undissolved even upon long contact with water.

In view of the properties of the end product of the process of the invention, those hydrophobizing agents are especially selected which give the calcium hydroxide hydrophibic properties by themselves or in conjunction with the absorbed organic substances. Suitable for this purpose are, for example, fatty acids, such as stearic and palmitic acid, but also fractions of petroleum, such as paraffin oil. The selection and amount of the hydrophobizing agent will depend decisively on what is to be done with the end product, i.e., the calcium hydroxide containing the waste substances in adsorbed form. As a rule the desired action is achieved by the addition of 0.1 to 5 wt-%, especially 1 to 3 wt-%, of the hydrophobizing agent. In some instances the surface active agent may also function as the hydrophobizing agent as where there is a long carbon chain, e.g., fatty acids.

In order that the calcium oxide treated with hydrophobizing agents and in some cases other adjuvants may absorb the wastes before it is reacted to calcium hydroxide with the water present in the system or added thereto, with the adsorptive binding of the organic substances, it suffices to mix the treated quicklime with the waste substance. If liquids are involved, it is enough to stir the treated quicklime into them or to imbibe lumps of quicklime with them. If the waste additionally contains solids, provision can be made for a thorough distribution of the treated calcium oxide in the system by means of suitable mixers or kneaders.

The amount of treated quicklime required in order to render the wastes harmless depends essentially on the desired state of the end product or the possible use to which it may be put. In the case of liquids it is sufficient to add so much treated calcium oxide that the calcium hydroxide containing the wastes adsorptively bound is produced in the form of a dry powder on the basis of its hydrophobic properties. In the majority of practical applications the weight ratio of treated calcium oxide to the waste substances to be made harmless ranges from about 1:1 to 1:10.

Surprisingly it has been found that the hydrophobic calcium hydroxide resulting as the end product can be carbonized with the included wastes with exceptional ease, which is evidently due to the fine division of the calcium hydroxide formed in the process of the invention. After only a few days of storage in air, it is no longer alkaline calcium hydroxide, but calcium carbonate. Through the appropriate choice of the hydrophobizing agent, this and the adsorbed organic waste substances which are also in finely divided form, can be biologically degraded. In cases in which biological decomposition of the waste is possible, adjuvants which themselves are biodegradable are seleted. These include, for example, natural fatty acids, such as stearic and palmitic acid, and alkanes such as paraffin oil. What has been said also applies when the waste substance still contains a solid phase, and it is, for example, crude oil which is both on and in the soil. In this case it is expedient to use hydrophobized quicklime containing, for example, 0.4 wt-% stearic acid and 0.2 wt-% paraffin oil in very finely divided form. This can then be blown onto the oil layer according to its thickness; the oil that is on the ground immediately sinks in, and the oil in the soil is brought in contact with the treated quicklime mechanically, with a rotary tiller, for example. If the soil moisture is insufficient for the reaction, the amount of water necessary for hydroxide formation is sprinkled on and worked in; the distribution of the oil which is in the hydrophobized calcium oxide into the large surface area of the end product, i.e., the calcium hydroxide, will then take place. The charged powdered absorption agent can be tilled into the subsoil where the oil is accessible to biodegradation on account of its extremely fine division. The calcium hydroxide will be transformed in the course of time into calcium carbonate.

If aqueous multi-phase systems with a high percentage of acid resins or emulsified used oils are to be made fit for dumping, hydrophobized calcium oxide is added preferably in such amounts that the end product will be a solid. The dry, highly hydrophobic powder that results, which is no longer wettable with water, can be used in the form of a layer up to several meters thick as a lining for dumps for oily materials. That is, this very hydrophobic powder absorbs oil very greedily, so that oil pollution can no longer get into the ground water. For example, if calcium hydroxide and used oil are present in an end product obtained by the present invention, in a weight ratio of 1:1, additional oil and oily substances can nevertheless be adsorbed in considerable amounts, namely up to approximately double its weight. The hydrophobic end product is particularly well suited for the above-named application if it contains non-biodegradable adjuvants such as, for example, stearylamine, or dimethylbenzylstearyl ammonium chloride. It can also be used to special advantage as a construction material in street and highway construction, especially as a frostproofing layer.

Lastly, it is very important to transform waste substances such as used lubricating and motor oils, even chemically in some cases. The adsorption in accordance with the instant invention is performed such that the heat of the reaction of the reactive, charged quicklime with water is dammed up until a spontaneous coking process begins. For this purpose the product charged with the waste and containing the necessary amount of water, but not yet fully reacted to calcium hydroxide, is placed in a ditch and covered with a thin layer of dirt. After a period of time the contents of this "minidump" cokes without any appreciable formation of smoke; this will take place in hours or days depending on the quantity. What remains is an ash which can be used for fertilizing purposes.

The process of the invention, however, is usable not only for rendering liquid wastes harmless; sludges can also be rendered harmless, such as those, for example, which are produced by electroplating processes, or which are produced in the form of charged bleaching earths in the bleaching of dark mineral oils or fatty oils. To this end the alkaline earth metal oxide to be used in accordance with the invention is stirred into the waste sludge in a ratio of about 1:1, and is then further processed in the manner taught by the invention.

Oils floating on water, as well as whole lakes of waste oils representing aqueous multi-phase systems due to the presence of ground water or rainwater, may be rendered harmless by the method of the invention. It is expedient to select again for this purpose hydrophobized quicklime which has been pretreated with somewhat larger amounts of hydrophobizing adjuvants, e.g. about 1 to 5 wt-%, for the purpose of checking the formation of hydroxide as long and as effectively as possible. The quicklime thus treated is so hydrophobic that it floats on water.

It absorbs the oil at different rates according to the origin of the oil, and sinks when it is charged with oil. After a period of time—hours, for example, on open waters—the chemical reaction with the water begins. This results in the formation of calcium hydroxide which acts as an adsorptive agent which in statu nascendi fixes the oil in very finely divided form. If the adjuvants serving for the pretreatment of the quicklime are appropriately selected, this end product is biodegraded after a period of time.

In combatting oil in deep waters, suitable oxygen carriers can be added to the treated calcium oxide, which promote not only chemical but also biological degradation. These include, for example, nitrates and sulfates. They are locked onto the particles after the reaction and cannot be eluted by the water on account of the hydrophobic shell.

The following examples are illustrative of the practice of the invention:

EXAMPLE 1

For the elimination of 190 kg of used motor oil, 190 kg of quicklime containing 1 wt-% stearic acid and 0.2 wt-% sodium diisooctylsulfosuccinate is mixed in with it. Then the calcium oxide is reacted with 80 l of water. After about 30 minutes a powdery, dry solid is obtained, one kilogram of which can still absorb approximately one half kilogram of additional used oil.

EXAMPLE 2

100 kg of an electroplating sludge containing approximately 20 wt-% of inorganic and organic components plus 80% water can no longer be broken down to separate a clean aqueous phase on account of its consistency. 150 kg of pretreated quicklime (1% fatty acid) is stirred into it. The water that is present is completely eliminated by the formation of hydroxide and by evaporation due to the heat of reaction. A highly hydrophobic powder forms which contains the components of the electroplating sludge so fixed that the dumped product is no longer wetted by surface or ground water.

EXAMPLE 3

500 kg of a pasty emulsion containing 240 kg of various organic substances is mixed by stirring with 500 kg of a fine white lime pretreated with 5 wt-% of a mixture of stearic and palmitic acid. After the reaction a dry, dumpable powder is formed.

EXAMPLE 4

10 kg of an acid resin industrial byproduct is placed in a kneader in which sulfuric acid present in the resin is first neutralized with untreated quicklime. Then 4 kg of water and 10 kg of fine white lime are added, the latter having been treated with 2 wt-% of a mixture of stearic and palmitic acid and 0.5 wt-% of succinate. During the kneading only the resin is at first absorbed by the hydrophobized calcium oxide. The reaction with water does not take place until after about 20 minutes of additional mechanical treatment. A dumpable powder results.

EXAMPLE 5

100 kg of diesel oil is to be removed from a sea beach. Approximately 100 kg of fine white lime plus 1 wt-% of a mixture of stearic and palmitic acid and 0.5 wt-% paraffin oil is distributed over the beach by means of a spreader truck with a proportioning apparatus. Then the ground is worked over with a rotary tiller to such a depth that all of the diesel oil that has seeped into the soil comes in contact with the pretreated fine white lime. After 80 liters of water have been sprayed on the ground is tilled again. The end product that forms can be left in the ground since it contains the diesel oil in very finely divided form, i.e., in easily decomposable form.

EXAMPLE 6

One cubic meter of an emulsion from a special dump is treated in a tank equipped with a propeller type agitator with 600 g of a pretreated calcium oxide containing 5% of a nonylphenyl polyglycol ether. Then the propeller agitator is operated for about 1 minute. The emulsion precipitates and in about 10 seconds a bottom sludge has formed, the supernatant liquid consisting of clear water. The purified aqueous phase is decanted and the remainder plus the sludge is filtered on a belt filter. After the chemical reaction of the sludge the hydrophobic components from the oily phase of the emulsion are so fixed on the adsorptive agent that the end product can be dumped as a dry powder.

EXAMPLE 7

One cubic meter of a synthetic resin dispersion containing approximately 7% synthetic resin is stirred energetically with 1 kg of pretreated calcium oxide (2% paraffin oil) for several minutes. the synthetic resin immediately precipitates and sinks on the adsorptive agent to the bottom. Filtration with a belt filter yields a clarified aqueous phase and, after the chemical reaction of the sludge, a dry powder.

EXAMPLE 8

Two kg of an adsorptive agent consisting of quicklime with 2 wt-% paraffin oil is stirred into 100 liters of an aqueous neutral emulsion containing 2 kg of drilling oil. After a few minutes complete clarification takes place; the bottom sludge is removed by filtration. The pH of the aqueous medium is at first 11, but by brief gassing with air it is easily reduced.

EXAMPLE 9

An aqueous emulsion from a machine shop (2 kg oil in 100 l of water) is stirred with 2 kg of quicklime containing 6 wt-% nonylphenoltetraglycol ether. Within 2 minutes complete clarification of the emulsion takes place. The solid end product is removed by filtration.

EXAMPLE 10

For the separation of a synthetic resin dispersion containing 400 g of an epoxy resin per liter, the adsorber selected is a mixture of calcium oxide and magnesium oxide (10% MgO) containing 1 wt-% paraffin oil and 1 wt-% nonylphenol tetraglycol ether. 50 g of this adsorber is stirred into 1 liter of the synthetic resin dispersion. After 5 minutes clarification of the dispersion takes place. The precipitated solid is removed by filtration.

EXAMPLE 11

Approximately 50 tons of crude oil which is lying on arable land and some of which had seeped into the soil are rendered harmless in the following manner: approximately 50 tons of powdered calcium oxide containing 0.5 wt-% of a mixture of stearic acid and palmitic acid plus 0.2 wt-% of paraffin oil very finely distributed therein are deposited with a blower from a hopper truck onto the surface of the crude oil (approximately 15 cm thick). After about 30 minutes the free oil is absorbed by the treated calcium oxide. This results in a thin slurry of treated oxide and oil. Then the soil is worked with a rotary tiller to such a depth that all of the percolated oil comes in contact with the calcium oxide. In spite of the presence of moisture in the soil, no reaction with the ground water takes place until all of the oil has been adsorbed in the mechanical working by the calcium oxide. In the chemical reaction a dry and hydrophobic powder is formed of the oil slurry in the soil.

The end product, which was partially on the surface of the ground and partially in the soil, is buried with a bulldozer at a depth of about 50 cm under the previously bulldozed subsoil, where the oil, no longer recognizable as a phase is accessible to biological decomposition after the carbonization of the calcium hydroxide, due to its being so very finely divided.

EXAMPLE 12

From a pond whose surface is covered with an oil slick about 10 cm thick, oil and water are pumped into a conical container with a capacity of about 5 m$^3$ equipped with a stirrer. At the bottom of the cone the container has an outlet valve. In addition, a second outlet valve is installed on the container such that, after the liquid above it has been drained, a volume of 600 liters of liquid will remain. After the water-oil mixture is pumped in the oil floats on the surface of the water in the tank. Excess water is let out of the tank through the side valve and the pumping action is repeated until approximately 1600 liters of oil have collected in the tank (measured by a level mark). Underneath the oil the required amount of 600 liters of water will thus be present. By means of a screw conveyor 1600 liters of powdered, pretreated (with 1 wt-% of a fatty acid mixture of $C_{14}$ to $C_{18}$ acid) calcium oxide are added, and the stirrer is started up. The calcium oxide at first rapidly mixes with the oil and is not wetted by the water. Not until after 10 minutes of stirring is the water also absorbed by the suspension. A thin slurry forms. This slurry is immediately released through the bottom valve into a reaction vessel if the resultant product is to be further processed, or, if the end product is to be dumped, it is immediately delivered to the floor of the dump. Here the chemical reaction takes place after a period of time (about ½ to one hour) and a dry, hydrophobic powder forms in which the oily phase is no longer recognizable.

It will be appreciated that the instant specification and examples are set forth by way of illustration and not limitation, and that various modifications and changes may be made without departing from the spirit and scope of the present invention.

What is claimed is:

1. A method for rendering harmless an oily waste material comprising mixing an alkaline earth metal oxide with about 0.001 to 10% its weight of a surface active agent which temporarily delays reaction between the alkaline earth metal oxide and water until after the alkaline earth metal oxide was interacted with the oily waste material, combining the alkaline earth metal oxide carrying the surface active agent with said oily material, and reacting the alkaline earth metal oxide charged with the waste material with water to convert the alkaline earth metal oxide to the hydroxide.

2. The method of claim 1, wherein the oily waste material is insoluble in water and is present in an aqueous multiple-phase system.

3. The method of claim 2, wherein the pretreated alkaline earth metal oxide is added to the aqueous multiple phase system in such quantity that a solid forms as the end product.

4. The method of claim 1, wherein the alkaline earth metal oxide is calcium oxide.

5. The method of claim 4, wherein the calcium oxide is mixed with about 0.01 to 5% its weight of a surface active agent selected from the group consisting of a fatty acid, paraffin oil and an aliphatic alcohol, the calcium oxide carrying the surface active agent is combined with at least an equal weight of the oily waste material, and the calcium oxide charged with the oily waste material is reacted with approximately the stoichiometric amount of water.

6. The method of claim 1, wherein the alkaline earth metal oxide is also treated with about 0.1 to 5% its weight of a hydrophobizing agent prior to mixing with the oily waste material, whereby the alkaline earth metal oxide is rendered hydrophobic.

7. The method of claim 1, wherein the alkaline earth metal oxide is calcium oxide and the surface active agent is used in about 0.01 to 5% and the hhdrophobizing agent in about 1 to 3% by weight of the calcium oxide.

8. The method of claim 1, wherein the surface active agent is biologically degradable.

9. The method of claim 1, including the further step of exposing the alkaline earth metal hydroxide containing the waste material to the action of carbon dioxide.

10. The method of claim 1, wherein the alkaline earth metal oxide charged with oily waste material is reacted with water under a protective cover so that the heat of reaction effects coking of the waste material.

11. The method of claim 1, including the further steps of lining a dump site with the alkaline earth metal hydroxide laden with the oily waste material and thereafter piling dump waste on said lining.

12. The method of claim 1, including the further step of laying down the alkaline earth metal hydroxide laden with the oily waste material on a road bed.

* * * * *

UNITED STATES PATENT AND TRADEMARK OFFICE
CERTIFICATE OF CORRECTION

PATENT NO. : 4,018,679
DATED : April 19, 1977
INVENTOR(S) : Friedrich Bölsing

It is certified that error appears in the above-identified patent and that said Letters Patent are hereby corrected as shown below:

| | |
|---|---|
| Col. 5, line 42 | cancel "seleted" and substitute -- selected -- |
| Col. 8, line 16 | cancel "the" and substitute -- The -- |
| Claim 1, col. 9, line 50 | cancel "was" and substitute -- has -- |
| Claim 7, col. 10, line 31 | cancel "hhdrophobizing" and substitute -- hydrophobizing -- |

Signed and Sealed this

Sixth Day of September 1977

[SEAL]

Attest:

RUTH C. MASON
Attesting Officer

LUTRELLE F. PARKER
Acting Commissioner of Patents and Trademarks